US012160160B1

(12) United States Patent
Rosenwald et al.

(10) Patent No.: US 12,160,160 B1
(45) Date of Patent: Dec. 3, 2024

(54) PASSIVE OIL PUMP ARRANGEMENT FOR COOLING AN ELECTRIC MOTOR

(71) Applicant: Schaeffler Technologies AG & Co. KG, Herzogenaurach (DE)

(72) Inventors: Andreas Rosenwald, Nuremberg (DE); Günter Völkel, Puschendorf (DE); Viktor Ruder, Fürth (DE); Fritz Wiesinger, Neuendettelsau (DE); Benjamin Kaestner, Höchstadt (DE); Carlo Vinci, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/338,753

(22) Filed: Jun. 21, 2023

(51) Int. Cl.
| | |
|---|---|
| *H02K 9/19* | (2006.01) |
| *F16H 57/04* | (2010.01) |
| *F16N 7/36* | (2006.01) |
| *H02K 7/116* | (2006.01) |

(52) U.S. Cl.
CPC ........... *H02K 9/19* (2013.01); *F16H 57/0486* (2013.01); *F16N 7/36* (2013.01); *H02K 7/116* (2013.01); *F16N 2210/12* (2013.01); *F16N 2210/18* (2013.01)

(58) Field of Classification Search
CPC .. H02K 9/19; H02K 7/116; F16N 7/36; F16N 2210/12; F16N 2210/18; F16H 57/0486
USPC ......................................................... 475/161
See application file for complete search history.

(56) References Cited

U.S. PATENT DOCUMENTS

| | | | | |
|---|---|---|---|---|
| 5,718,302 A | * | 2/1998 | Hasebe ................. | H02K 7/116 180/65.6 |
| 5,901,802 A | * | 5/1999 | Sunohara ............ | F16H 57/0434 184/6.12 |
| 6,087,744 A | * | 7/2000 | Glauning ............... | H02K 5/203 310/58 |
| 6,329,731 B1 | * | 12/2001 | Arbanas ............... | F16H 57/043 310/58 |
| 7,009,317 B2 | * | 3/2006 | Cronin .................. | H02K 5/203 310/52 |
| 10,941,788 B2 | * | 3/2021 | Iizuka ..................... | F04D 17/10 |
| 2021/0222767 A1 | * | 7/2021 | Jabido ................. | F16H 57/0442 |
| 2021/0394600 A1 | * | 12/2021 | Absenger .............. | H02K 7/116 |

* cited by examiner

*Primary Examiner* — Colby M Hansen
(74) *Attorney, Agent, or Firm* — Volpe Koenig

(57) ABSTRACT

A drive assembly with passive cooling and/or lubrication. The drive assembly includes a housing, an electric motor having a shaft that is rotatably drivable about an axis of rotation, and a gear assembly located in the housing. The gear assembly is rotatably drivable by the shaft, and includes a plurality of gears that are rotatable in a rotational drive direction. An oil removal opening is located on an inner wall of the housing aligned with the gears, with the oil removal opening being located between −45 and +45 degrees from a horizontal plane that extends through the axis of rotation on a rotationally upward moving side of the gears in the rotational drive direction. The oil removal opening has an upper edge that is angled and faces counter to the rotational drive direction. An oil delivery channel extends from the oil removal opening to a feed port for the motor.

15 Claims, 2 Drawing Sheets

PASSIVE OIL PUMP ARRANGEMENT FOR COOLING AN ELECTRIC MOTOR

TECHNICAL FIELD

The disclosure relates to cooling an electric motor, and more particularly to cooling and/or lubrication of an electric motor of a hybrid or electric vehicle using a passive system that is effective at low speeds.

BACKGROUND

Electric motors used in drive assemblies, such as for electric or hybrid vehicle drives, must be cooled. This can be done by flooding the cooling areas of the motor with oil from the drive system. This can be done actively using pumps. However, it is also possible to passively direct cooling oil to the electric motor. Active oiling systems are usually associated with increased costs and number of components, so passive systems are preferred.

Drive assemblies that have at least some passive oil or lubricant cooling are also known. These include splash systems that distribute oil or cooling lubricant by a moving part, such as a gear or specific splash vane moving through a reservoir that is used to direct the oil or cooling lubricant to a part to be cooled. However, these systems are less reliable at low speeds.

It would be desirable to provide a drive assembly that can provide the desired cooling at low speeds without additional parts or the costs of an active oil pump system.

SUMMARY

In one aspect, a drive assembly, preferably for a hybrid or electric motor vehicle, with enhanced passive cooling and/or lubrication is provided. The drive assembly includes a housing, an electric motor having a shaft that is rotatably drivable about an axis of rotation, and a gear assembly located in the housing. The gear assembly is rotatably drivable about the axis of rotation by the shaft, and the gear assembly includes a plurality of gears that are rotatable in a common radial plane in a rotational drive direction. An oil removal opening is located on an inner wall of the housing that is aligned with the common radial plane, with the oil removal opening being located between 0 and +90 degrees from a horizontal plane that extends through the axis of rotation on a rotationally upward moving side of the plurality of gears in the rotational drive direction. The oil removal opening has an upper edge, which can be a milled edge (i.e., the edge is machined or milled to be a sharp edge rather than a typical rounded casting edge), that is angled and faces counter to the rotational drive direction. An oil delivery channel extends from the oil removal opening to a port that feeds toward the electric motor. With this arrangement, oil splashed by the plurality of gears that travel in the rotational drive direction is captured by the oil removal opening and centrifugal force forces the oil into the oil delivery channel where it is delivered to the port that feeds to the electric motor, which can be used for cooing and/or lubrication of the electric motor bearings. With this arrangement, at low speeds of the electric motor, more oil is pumped in comparison with the prior art arrangements where oil is removed after the top dead center position since less kinetic energy is required to overcome the losses in energy due to the height of the removal point. Additionally, at high rotational speeds, a high pressure is generated. With this radial extraction, fewer losses in energy occur than with axial extraction.

In one embodiment, the oil delivery channel includes a crescent-shaped diverter portion that extends from the upper edge of the oil removal opening further upwardly prior to curving downwardly toward the port that feeds toward the electric motor. This allows the centrifugal/radially outwardly directed force of the oil to be transferred downwardly with as little loss as possible so that the pressure force that is generated by this action is maintained with as little loss as possible so that the oil is fed with some pressure through the port.

In one embodiment, the gear assembly is a planetary gear assembly, and the plurality of gears include planet gears that are rotatable in the common plane. The planet gears are driven by a sun gear and also engage with a ring gear formed on or fixed to the inner wall of the housing.

In one embodiment, the planet gears have an axial thickness, and the oil removal opening has a width that at least partially overlaps the axial thickness of the planet gears. The size of the oil removal opening can be adjusted depending on the particular arrangement, available space and desired volume flow.

In one embodiment, the upper edge of the oil removal opening is located radially inwardly from a portion of the inner wall of the housing that extends downwardly from a lower edge of the oil removal opening. This allows the upper edge to be more effective at capturing the oil and directing it into the oil removal opening. This offset in the radial distance can be, for example, from 0.2 to 1.5 cm. However, the specific offset can be varied depending on the particular arrangement. Additionally, the distance between the upper edge and the planets is preferably in the range of 0.5 to 3 mm, and more preferably 1 to 2 mm, in order to impart sufficient flow energy to the oil to be captured and fed through the oil delivery channel. Further, the distance between the inner wall and the planets is preferably in the range of 2 to 6 mm, and more preferably 3 to 5 mm.

Additionally, the oil delivery channel can optionally be wider radially at a top region in proximity to the oil removal opening than at a bottom region in proximity to the port that feeds toward the electric motor. This creates more space at the top for oil collection, and also increases the pressure by narrowing of the cross-sectional area as the oil moves downwardly in the oil delivery channel.

In one embodiment, the gear assembly and the electric motor are located in the housing, the electric motor is separated from the gear assembly by a dividing wall, the shaft extends through the dividing wall, and the port is configured to deliver oil from a gear assembly side of the dividing wall to an electric motor side of the dividing wall. Here, for example, the oil can be directed to bearings for lubrication or to a heat exchanged.

In one preferred application, a hybrid or electric vehicle drive is formed from the drive assembly.

In another aspect, a method of passively pumping oil from a gearbox assembly to an electric motor connected to the gearbox assembly is provided. The includes:
  a) providing a housing in which the electric motor and the gearbox assembly are located, the electric motor having a shaft that is rotatably drivable about an axis of rotation, and the gear assembly being rotatably drivable about the axis of rotation by the shaft, the gear assembly including a plurality of gears that are rotatable in a rotational drive direction;

b) the shaft rotatably driving the plurality of gears in the rotational drive direction, and the plurality of gears splashing oil into an oil removal opening on an inner wall of the housing that is aligned with the plurality of gears, with the oil removal opening being located between 0 and +90 degrees from a horizontal plane that extends through the axis of rotation on a rotationally upward moving side of the plurality of gears in the rotational drive direction, the oil removal opening having an upper edge that is angled and faces counter to the rotational drive direction;

c) capturing the oil via the upper edge of the oil removal opening and directing the oil to an oil delivery channel that extends from the oil removal opening to a port; and d) feeding oil from the port to the electric motor for at least one of cooling or bearing lubrication.

In one aspect, the method can include providing a crescent-shaped diverter portion of the oil delivery channel that extends from the upper edge of the oil removal opening further upwardly prior to curving downwardly toward the port that feeds toward the electric motor, and guiding the oil splashed into the oil removal opening radially outwardly and then downwardly via the crescent-shaped diverter portion.

In another aspect, the gear assembly can be a planetary gear assembly, the plurality of gears can include planet gears that are rotatable in the common plane, and the method then further includes driving the planet gears in the rotational drive direction in order to generate the splashing/centrifugal force on the oil.

In another aspect, the planet gears have an axial thickness, and the oil removal opening has a width that at least partially overlaps the axial thickness of the planet gears. This allows for more efficient collection of the oil that is splashed by the gears as they are driven in the rotational drive direction.

In another aspect, the upper edge of the oil removal opening can be located radially inwardly from a portion of the inner wall of the housing that extends downwardly from a lower edge of the oil removal opening, and the method further includes capturing the oil splashed radially outwardly against the portion of the inner wall of the housing by the upper edge protruding radially inwardly into a splash flow of the oil created by rotating the plurality of gears in the rotational drive direction. This also enhances oil collection.

The method may further include increasing a pressure of the oil via a narrowing of the oil delivery channel as the channel extends from the oil removal opening to the port that feeds toward the electric motor.

In a further aspect, the gear assembly and the electric motor may be located in the housing, the electric motor is separated from the gear assembly by a dividing wall, the shaft extends through the dividing wall, and the method further includes feeding the oil under pressure from a gear assembly side of the dividing wall to an electric motor side of the dividing wall.

Various features noted herein can be used alone or in combination in order to achieve one or more of the benefits described.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Figure 1:
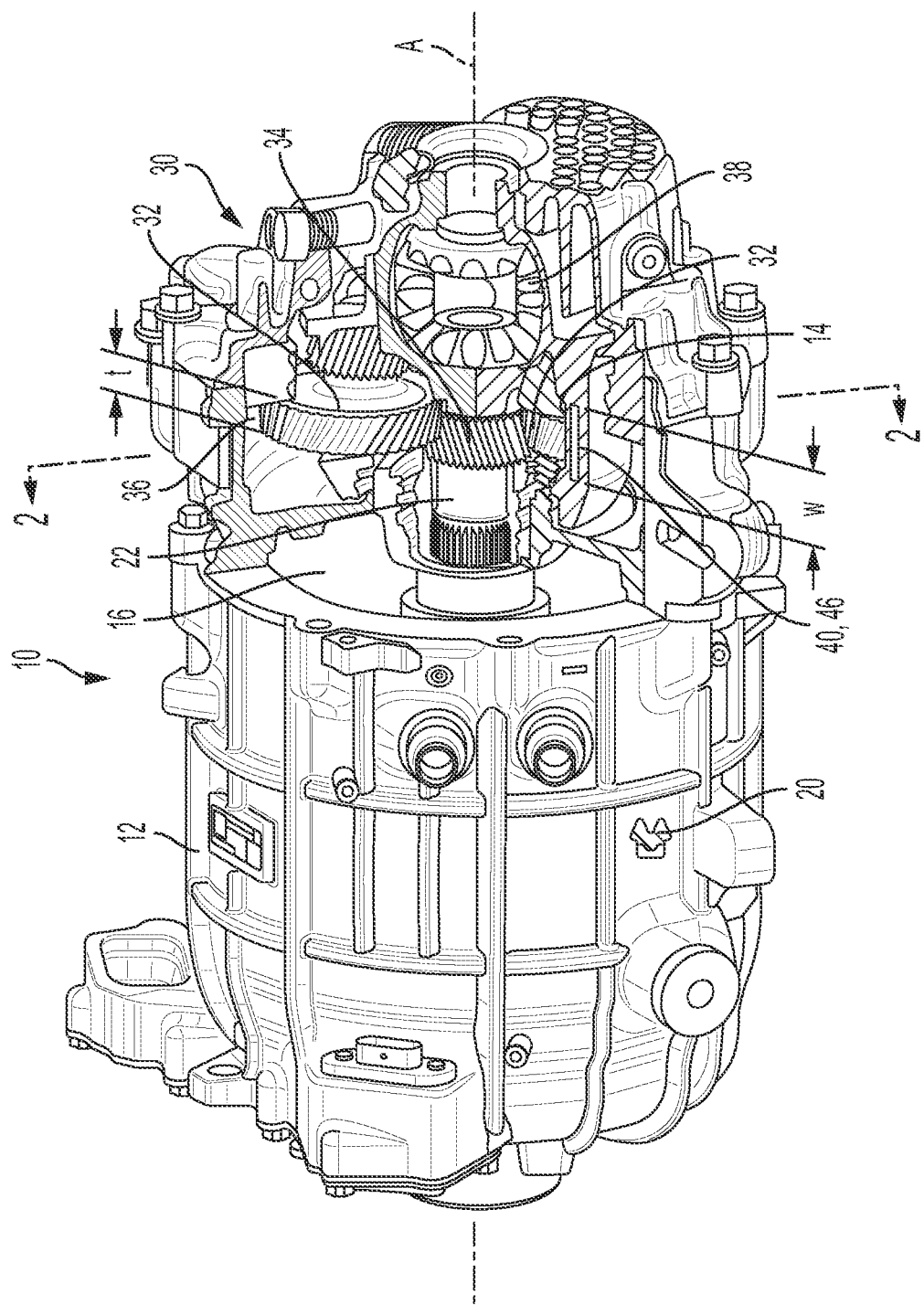
FIG. 1 is a perspective view of a drive assembly including an electric motor and a gear assembly that is driven by the electric motor, shown with the housing partially cut away in a region of the gear assembly.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. The terms "oil" and "lubricant" are used interchangeably herein and are intended to encompass the broadest reasonable meaning to a person of ordinary skill in this field. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass+ or −10% of an indicated value unless otherwise noted. The terminology includes the words specifically noted above, derivatives thereof and words of similar import.

Referring now to FIG. 1, a drive assembly 10, preferably for an electric or hybrid vehicle, is shown. The drive assembly 10 includes a housing 12 along with an electric motor 20 and a gear assembly 30. The housing 12 can be assembled from multiple components. The electric motor 20 has a shaft 22 that is rotatably drivable about an axis of rotation A. The gear assembly 30 is located in the housing 12, and is rotatably drivable about the axis of rotation A by the shaft 22. The shaft 22 from the electric motor 20 can be a hollow shaft. The gear assembly 30 includes a plurality of gears 32 that are rotatable in a common radial plane in a rotational drive direction D, indicated in FIG. 2.

Preferably, the gear assembly 30 is a planetary gear assembly that is used for reduction of the rotational speed of the shaft 22 from the electric motor 20, and includes a sun gear 34, a ring gear 36, as well the plurality of gears 32 which are planet gears that rotate between the sun gear 34 and the ring gear 36. This gear assembly 30 is preferably connected to a differential 38 which can drive axles (not shown) which extend from both sides of the differential 38 along the axis of rotation A, with the axle that extends to the left in FIG. 1 passing through the hollow shaft 22 of the electric motor 20.

In order to provide improved lubrication and cooling in a passive manner using the lubricant or oil 31 which is filled to a certain level within the chamber of the housing 12 that houses the gear assembly 30, an oil removal opening 40 is provided on an inner wall 14 of the housing 12 that is aligned with the common radial plane R. The oil removal opening 40 is located between about 0° and +90° from a horizontal plane X that extends through the axis of rotation A on a rotationally upward moving side of the plurality of gears 32 in the rotational drive direction B, indicated in FIG. 2. More preferably, the opening is located between 0° and +30°.

The oil removal opening 40 has an upper edge 42, preferably milled, that is angled and faces counter to the rotational drive direction D in order to capture the oil 31 as it is splashed upwardly in the rotational drive direction D by the plurality of gears 32.

The upper edge 42 of the oil removal opening 40 is located radially inwardly, preferably at a distance R1 from the axis of rotation A, from a portion of the inner wall 14 of the housing 12 that extends downwardly from a lower edge 44 of the oil removal opening 40. This portion of the inner wall 14 at the lower edge 44 is preferably located at a distance R2 from the axis of rotation A. Preferably, the difference between the radial distances R2 and R1 can be, for example, 0.5 to 1.5 cm. This forms a scoop-shaped inlet for the oil 31.

Figure 2:
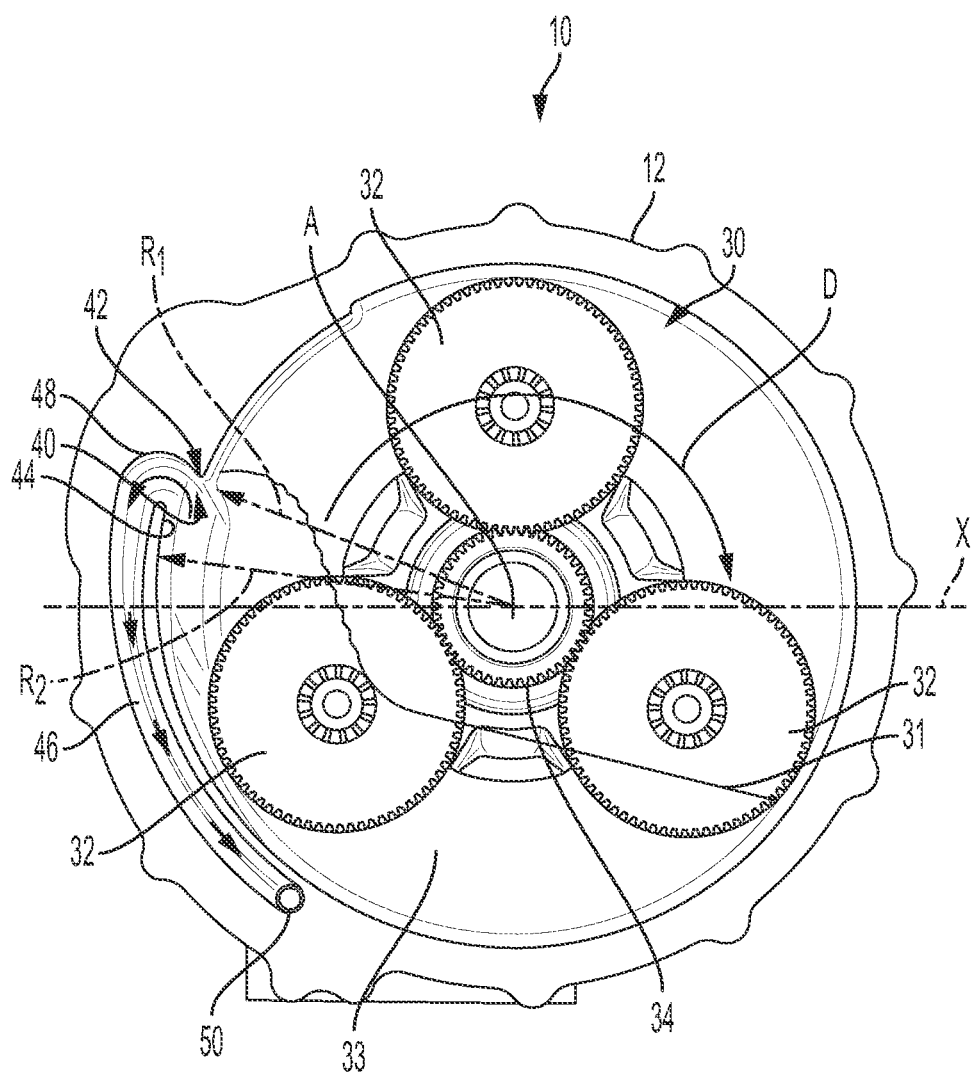
FIG. 2 is a cross-sectional view taken through the gear assembly at line 2-2 in FIG. 1 in an area of the oil delivery channel that extends from an inner wall of the housing.

Still with reference to FIG. 2, an oil delivery channel 46 extends from the oil removal opening 40 to a port 50 that feeds toward the electric motor 20 for both lubrication and cooling. In order to reduce losses, the oil delivery channel 46 includes a crescent-shaped diverter portion 48 that extends from the upper edge 42 of the oil removal opening 40 further upwardly and outwardly in the radial direction prior to curving downwardly toward the port 50 that feeds the electric motor 20. The forces generated by the plurality of gears 32 contacting the oil 31 imparts a centrifugal force to the oil 31 that drives the oil 31 into the oil removal opening 40 where it is diverted radially, outwardly and downwardly with reduced losses due to the crescent-shaped diverter portion 48.

As shown in FIG. 1, the gears 32 have an axial thickness t and the oil removal opening 40 has a width W that at least partially overlaps the axial thickness t of the gears 32. At a minimum, this thickness t of the gears 32 at least partially axially overlaps the oil removal opening 40.

Still with reference to FIGS. 1 and 2, the oil delivery channel 46 is wider radially at a top region in proximity to the oil removal opening 40 than at a bottom region in proximity to the port 50 that fees toward the electric motor 20. By narrowing the oil delivery channel 46 as it progresses toward the port 50, an increased flow of the oil 31 is provided.

Preferably, both the gear assembly 30 and the electric motor 20 are located in the housing 12, which can be a multi-part housing 12, and the electric motor 20 is separated from the gear assembly 30 by a dividing wall 16. The shaft 22 extends through the dividing wall 16 and the port 50 is configured to deliver oil from a gear assembly side of the dividing wall 16 to an electric motor side of the dividing wall 16 back to the reservoir 33 at the bottom of the housing 12 of the gear assembly 30.

Preferably, the drive assembly 10 is part of a hybrid or electric vehicle drive. As noted above, the shaft 22 from the electric motor 20 can be hollow in order to allow axles to extend from the differential 38 in both directions along the axis A.

In another aspect, a method of passively pumping oil from a gear assembly 30 to an electric motor 20 connected to the gear assembly 30 is provided. The method includes:

Providing a housing 12 in which the electric motor 20 and the gear assembly 30 are located, with the electric motor 20 having a shaft 22 that is rotatably drivable about an axis of rotation A. The gear assembly 30 is rotatably drivable about the axis of rotation A by the shaft 22. The gear assembly includes a plurality of gears 32 that are rotatable in a rotational drive direction D.

The method includes the shaft 22 rotatably driving the plurality of gears 32 in the rotational drive direction D, and the plurality of gears 32 splashing oil 31 from a reservoir in the gear assembly chamber within the housing 12 into an oil removal opening 40 on an inner wall 14 of the housing 12 that is aligned with the plurality of gears 32. The oil removal opening 40 is located between 0° and +90° from a horizontal plane X that extends through the axis of rotation A on a rotationally upward moving side of the plurality of gears 32 in the rotational drive direction D. The oil removal opening 40 has an upper edge 42 that is angled and faces counter to the rotational drive direction D.

The method further includes capturing the oil 31 via the upper edge 42 of the oil removal opening 40 and directing the oil 31 to a delivery channel 46 that extends from the oil removal opening 40 to a port 50.

The method further includes feeding oil 7 from the port 50 to the electric motor 20 to at least one of cooling or bearing lubrication.

In another aspect, the method may include providing the crescent-shaped diverter portion 48 of the oil delivery channel 46 as described above.

The method may further include that the gear assembly 30 is a planetary gear assembly and that the plurality of gears 32 include the planet gears 32 that are rotatable in the common plane R. Here, the planet gears 32 are driven in the rotational drive direction D.

In another aspect, the method may include that the planet gears 32 have an axial thickness t as described above, and the oil removal opening 40 having a width W that at least partially overlaps the axial thickness t of the planet gears 32.

The method may further include the upper edge 42 of the oil removal opening being located radially inwardly, for example at a radial distance R1 from the axis A, from a portion of the inner wall 14 of the housing 12 that extends downwardly from a lower edge 44 of the oil removal opening 40, which can be located for example at a radial distance R2 from the axis A. The method includes capturing the oil 31 splashed radially outwardly against the portion of the inner wall 14 of the housing 12 due to the upper edge 42 protruding radially inwardly into the splash flow of the oil 31 created by rotating the plurality of gears 32 in the rotational drive direction D.

In another aspect, the method can include increasing a pressure of the oil 31 that is captured by the oil removal opening 40 by narrowing the oil delivery channel 46 as the channel 46 extends from the oil removal opening 40 to the port 50 that feeds toward the electric motor 20.

Additionally, the method can further include locating the gear assembly 30 as well as the electric motor 20 within the housing 12, with the electric motor 20 being separated from the gear assembly 30 by a dividing wall 16. Here, the shaft 22 extends through the dividing wall, preferably with a seal, and the method further comprises feeding the oil 31 under pressure from the gear assembly side of the dividing wall 16 to the electric motor side of the dividing wall 16 in order to provide lubrication and/or cooling of the electric motor 20.

Having thus described the above embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the described embodiment are possible which do not alter, with respect to those parts, the concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 10 drive assembly
12 housing
14 inner wall
16 dividing wall
20 electric motor
22 shaft
30 gear assembly
31 oil/lubricant
32 plurality of gears/planet gears
33 reservoir
34 sun gear
36 ring gear
38 differential
40 oil removal opening
42 upper edge
44 lower edge
46 oil delivery channel
48 crescent-shaped diverter portion
50 port
A axis of rotation
D rotational drive direction
R1 radial distance
R2 radial distance
t gear thickness
W opening width
x horizontal plane

The invention claimed is:

1. A drive assembly, comprising:
a housing;
an electric motor having a shaft that is rotatably drivable about an axis of rotation;
a gear assembly located in the housing, the gear assembly is rotatably drivable about the axis of rotation by the shaft, the gear assembly including a plurality of gears that are rotatable in a rotational drive direction;
an oil removal opening on an inner wall of the housing that is aligned with the common radial plane, the oil removal opening is located between 0 and +90 degrees from a horizontal plane that extends through the axis of rotation on a rotationally upward moving side of the plurality of gears in the rotational drive direction, and the oil removal opening has an upper edge that is angled and faces counter to the rotational drive direction; and
an oil delivery channel that extends from the oil removal opening to a port that feeds toward the electric motor.

2. The drive assembly of claim 1, wherein the oil delivery channel includes a crescent-shaped diverter portion that extends from the upper edge of the oil removal opening further upwardly prior to curving downwardly toward the port that feeds toward the electric motor.

3. The drive assembly of claim 1, wherein the gear assembly is a planetary gear assembly, and the plurality of gears include planet gears that are rotatable in a common plane.

4. The drive assembly of claim 3, wherein the planet gears have an axial thickness, and the oil removal opening has a width that at least partially overlaps the axial thickness of the planet gears.

5. The drive assembly of claim 1, wherein the upper edge of the oil removal opening is located radially inwardly from a portion of the inner wall of the housing that extends downwardly from a lower edge of the oil removal opening.

6. The drive assembly of claim 1, wherein the oil delivery channel is wider radially at a top region in proximity to the oil removal opening than at a bottom portion in proximity to the port that feeds toward the electric motor.

7. The assembly of claim 1, wherein the gear assembly and the electric motor are located in the housing, the electric motor is separated from the gear assembly by a dividing wall, the shaft extends through the dividing wall and the port is configured to deliver oil from a gear assembly side of the dividing wall to an electric motor side of the dividing wall.

8. A hybrid or electric vehicle drive comprising the drive assembly of claim 1.

9. A method of passively pumping oil from a gear assembly to an electric motor connected to the gear assembly, the method comprising:
providing a housing in which the electric motor and the gear assembly are located, the electric motor having a shaft that is rotatably drivable about an axis of rotation, and the gear assembly being rotatably drivable about the axis of rotation by the shaft, the gear assembly including a plurality of gears that are rotatable in a rotational drive direction;
the shaft rotatably driving the plurality of gears in the rotational drive direction, and the plurality of gears splashing oil into an oil removal opening on an inner wall of the housing that is aligned with the plurality of gears, with the oil removal opening being located between 0 and +90 degrees from a horizontal plane that extends through the axis of rotation on a rotationally upward moving side of the plurality of gears in the rotational drive direction, the oil removal opening having an upper edge that is angled and faces counter to the rotational drive direction;
capturing the oil via the upper edge of the oil removal opening and directing the oil to an oil delivery channel that extends to a port; and
feeding oil from the port to the electric motor for at least one of cooling or bearing lubrication.

10. The method of claim 9, further comprising providing a crescent-shaped diverter portion of the oil delivery channel that extends from the upper edge of the oil removal opening further upwardly prior to curving downwardly toward the port that feeds toward the electric motor, and guiding the oil splashed into the oil removal opening radially outwardly and then downwardly via the crescent-shaped diverter portion.

11. The method of claim 9, wherein the gear assembly is a planetary gear assembly, the plurality of gears include planet gears that are rotatable in a common plane, and the method further comprises driving the planet gears in the rotational drive direction.

12. The method of claim 11, wherein the planet gears have an axial thickness, and the oil removal opening has a width that at least partially overlaps the axial thickness of the planet gears.

13. The method of claim 9, wherein the upper edge of the oil removal opening is located radially inwardly from a portion of the inner wall of the housing that extends downwardly from a lower edge of the oil removal opening, and the method further comprises capturing the oil splashed radially outwardly against the portion of the inner wall of the housing by the upper edge protruding radially inwardly into a splash flow of the oil created by rotating the plurality of gears in the rotational drive direction.

14. The method of claim 9, further comprising increasing a pressure of the oil via a narrowing of the oil delivery channel as the channel extends from the oil removal opening to the port that feeds toward the electric motor.

15. The method of claim 9, wherein the gear assembly and the electric motor are located in the housing, the electric motor is separated from the gear assembly by a dividing wall, the shaft extends through the dividing wall, and the method further comprises feeding the oil under pressure from a gear assembly side of the dividing wall to an electric motor side of the dividing wall.

* * * * *